Patented Oct. 26, 1926.

1,604,143

UNITED STATES PATENT OFFICE.

MAX BOCKMÜHL, OF HOCHST-ON-THE-MAIN, AND WILHELM HEINRICH LUDWIG, OF FRANKFORT-ON-THE-MAIN, GERMANY, ASSIGNORS TO I. G. FARBENINDUSTRIE AKTIENGESELLSCHAFT, OF FRANKFORT, GERMANY.

BISMUTH COMPOUND OF AMINOPHENOLS AND PROCESS OF MAKING SAME.

No Drawing. Application filed January 3, 1924. Serial No. 684,253, and in Germany January 22, 1923.

We have found that complex bismuth compounds of slight toxicity and having an excellent action on the spirochætæ and other bacteria which cause infectious diseases are obtained by acting upon amino-hydroxy-benzoic acids with bismuth salts and introducing a group containing a hydroxyl, the action of the bismuth salts and the introduction of the group containing a hydroxyl being accomplished in any order of succession.

*Examples.*

(1) 15 g. of the sodium salt of 3-N-di-hydroxypropyl-amino-4-hydroxybenzoic acid are dissolved in 50 ccm. of water and to this solution is added a solution of 15 g. of bismuth nitrate in 30 g. of glacial acetic acid. The precipitated new bismuth acid is filtered off, washed with alcohol and dried. It contains 38.8% of bismuth. By dissolving the bismuth acid in a diluted solution of sodium carbonate the sodium salt of the bismuth compound is obtained.
The sodium salt which serves as starting material can be prepared by dissolving 25 g. of 3-amino-4-hydroxybenzoic acid in 125 g. of alcohol, adding a solution of sodium ethylate prepared from 3.5 g. of sodium and 75 ccm. of alcohol, whereby the sodium salt of this acid is precipitated and finally condensing the whole at 40° C. with 11.5 g. of glycide.

(2) To a solution of 32.5 g. of 3-N-dihydroxypropyl-amino-2-hydroxybenzoic acid (obtained by the action of glycide upon 3-amino-salicylic acid) in 100 ccm. of water is added a solution of 30 g. of bismuth nitrate in 60 ccm. of glacial acetic acid and the mixture is allowed to stand for some time. After having neutralized it with a solution of sodium carbonate and added sodium acetate, the bismuth compound, whose sodium salt is readily soluble in water, precipitates.
(3) 15.3 g. of 3-amino-4-hydroxybenzoic acid are dissolved in the form of its sodium salt in water, then there are added 18 g. of grape-sugar and the solution is heated on the water bath for three hours. After cooling, there is added a solution of 21.5 g. of bismuth nitrate in 45 ccm. of glacial acetic acid. After some time the whole is neutralized with sodium carbonate and the new bismuth compound is then precipitated by means of sodium acetate.

(4) A mixture of 19.6 g. of gluconic acid, 15.3 g. of 3-amino-2-hydroxybenzoic acid and 150 g. of water is heated for 3 hours. After cooling, 19.6 g. of bismuth nitrate, dissolved in 40 ccm. of glacial acetic acid, are added and the whole is made up as indicated in Example 3.

(5) 15.3 g. of 3-amino-4-hydroxybenzoic acid are dissolved in glacial acetic acid and mixed with a solution of 21.5 g. of bismuth nitrate in 45 ccm. of glacial acetic acid. After having added a solution of sodium acetate, the resulting bismuth compound is filtered off and heated in the form of its sodium-salt in aqueous solution with grape-sugar. The compound thus obtained is identical with that produced according to Example 3.

The probable constitution of the product formed in accordance with Example 1 is indicated by the following formula:

*Example 1.*

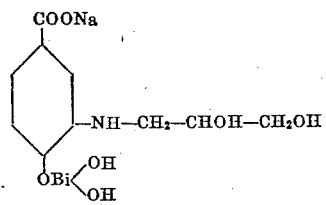

The probable constitution of the acid obtained according to Example 2 is indicated by the formula:

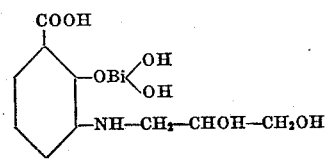

The probable constitution of the acid obtained according to Example 3 is indicated by the formula:

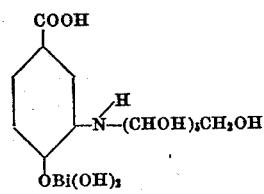

The probable constitution of the acid obtained according to Example 4 is indicated by the formula:

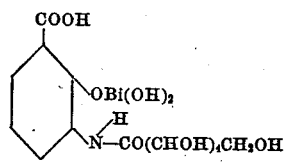

Having now described our invention what we claim is:

1. The process for preparing aromatic bismuth compounds having aliphatic lateral chains containing hydroxyl which are linked to the aryl by an amino group, consisting in causing salts of the trivalent bismuth and compounds which are capable of causing the linking of a lateral aliphatic hydroxyl-containing group to the amino group to act in any order of succession upon amino-phenols.

2. As new products, the bismuth compounds of the o-amino-phenols having aliphatic lateral chains containing hydroxyl which are linked to the aryl by an amino group.

In testimony whereof, we affix our signatures.

Dr. MAX BOCKMÜHL.
Dr. WILHELM HEINRICH LUDWIG.